United States Patent [19]

Pickett et al.

[11] 4,168,237
[45] Sep. 18, 1979

[54] DIFFERENTIAL PRESSURE SEAL GASKET STRUCTURE FOR A PRESSURE VESSEL

[75] Inventors: Charles G. Pickett, North Plainfield; Donald A. Turk, Sewaren; Phil DiParisi, New Providence; Albert B. Walulik, Cranford; Angelo Stanziale, Iselin, all of N.J.

[73] Assignee: Purolator, Inc., Rahway, N.J.

[21] Appl. No.: 896,099

[22] Filed: Apr. 13, 1978

[51] Int. Cl.$^2$ ............................................. B01D 27/04
[52] U.S. Cl. ..................................... 210/440; 210/444; 210/DIG. 17; 285/343; 285/DIG. 11
[58] Field of Search .............................. 210/440–444, 210/DIG. 17, 450; 285/343, 344, DIG. 11; D23/47

[56] References Cited

U.S. PATENT DOCUMENTS

| | | | |
|---|---|---|---|
| 1,071,585 | 8/1913 | Rossell | 285/DIG. 11 |
| 2,790,661 | 4/1957 | Tamminga | 285/DIG. 11 |
| 3,093,581 | 6/1963 | Pall et al. | 210/444 |
| 3,204,771 | 9/1965 | Baldwin | 210/440 X |
| 3,677,412 | 7/1972 | Connor | 210/440 |

FOREIGN PATENT DOCUMENTS 2536631 2/1917 Fed. Rep. of Germany ... 285/DIG. 11

Primary Examiner—William A. Cuchlinski, Jr.
Attorney, Agent, or Firm—Staas & Halsey

[57] ABSTRACT

A filter of the throw away spin-on type having a housing body with a closed end and an open end, a filter element mounted within said body, a cover plate secured to and closing said open end, a gasket retainer secured to the end closure cover plate, fluid input and output apertures provided in both the cover plate and the gasket retainer, the gasket retainer having a recessed pocket extending circumferentially around the fluid flow openings, inwardly of the outer circumference of the gasket retainer, said gasket pocket having a base at a specified angle relative to the surface plane of the cover plate, and a resilient flexible gasket member of special shape retained by the gasket retainer pocket. The specially configured sealing gasket member is preferably of rhomboid shape and thus a cross section thereof forms a parallelogram with oblique angles and opposite sides equal. The top and bottom surfaces of the sealing gasket form an angle of approximately 10° with the plane of the cover plate and the surface to be sealed, while the inner and outer sides of the gasket member are approximately normal (90°) to the surface to be sealed. A gasket member of trapezoid configuration in cross section may be used in a modified embodiment.

20 Claims, 6 Drawing Figures

DIFFERENTIAL PRESSURE SEAL GASKET STRUCTURE FOR A PRESSURE VESSEL

BACKGROUND OF THE INVENTION

1. Field of the Invention

This invention relates generally to sealing devices as normally used with fluid flow pressure devices.

2. Description of the Prior Art

The common problem with known type sealing gasket devices for use with fluid flow pressure devices, such as the oil filter cartridge of the spin-on, throw away type in great use today, is that these items are mass produced in great quantities, and the sealing gaskets associated therewith sometimes are not as fully checked by quality control as they should be.

Another problem is that often times slight distortions or surface defects are present on the engine block or other mating surface with which the pressure vessel is attached and used, and thus an imperfect seal occurs at the gasket seal joint therewith when the pressure vessel is attached to the engine block or other surface.

Known prior art devices have attempted to solve this sealing problem by various devices. Known prior patents which may be pertinent to this invention are as follows:

Humbert et al, U.S. Pat. No. 3,076,551
Baldwin, U.S. Pat. No. 3,204,771
Sawyer, U.S. Pat. No. 3,224,591
Offer, U.S. Pat. No. 3,557,963.

The patent to Humbert et al, U.S. Pat. No. 3,076,551 shows a gasket sealing member having a deformable lip which is associated with a filter unit and compressed thereby when the filter unit is attached to an automobile engine block. The shape and lip structure of the Humbert et al gasket member is entirely different from that of the invention disclosed herein.

The patent to Baldwin, U.S. Pat. No. 3,204,771, shows a number of different types of deformable gasket rings which will increase somewhat the sealing effect as the oil pressure flowing thereby increases. However, again each of the gasket rings shown are entirely different from that of the invention herein.

The patent to Sawyer, U.S. Pat. No. 3,224,591 shows a gasket member of substantially rectangular shape and cross section, which is supported by spaced internal and external gasket side rings for the proper support of the gasket member.

The patent to Offer, U.S. Pat. No. 3,557,963, shows a gasket ring which is deformed to an entirely different shape and use. The original triangular shape of this gasket member is entirely different from that of subject invention, and also the shape under use is entirely different.

None of the known prior art devices have the new and novel features of the invention disclosed herein.

SUMMARY OF THE INVENTION

An object of the present invention is to provide a pressure differential sealing gasket for a pressure vessel which will function to increase the sealing action as the pressure of fluid flow thereby increases.

Another object of this invention is to provide a sealing gasket for an oil filter cartridge of the spin-on, throw away type, which will produce a static seal upon initial installation of the oil filter and then, because of the unique arrangement of the sealing gasket structure, will effect an increase in the sealing action as the pressure of the fluid oil flowing thereby increases in amount.

A further object of this invention is to provide a fluid seal gasket member of ring-like configuration supported in a circular recess of a gasket retainer of a filter cartridge. The outer surface of the seal gasket, which mates with a sealing surface of an engine block or the like, is formed at an angle with respect to the plane of the gasket retainer of less than 45° for the purpose of providing a pressure differential sealing effect when mounted and in use.

A still further object of this invention is to provide a fluid seal gasket member of ring-like configuration with a cross section of rhomboid shape. The inner and outer sidewalls of the gasket member are parallel and normally perpendicular to the surface with which the gasket member will be used. The other two surfaces of the gasket member are at an angle of approximately 10° with the surface to be sealed, are parallel with each other, and complete the rhomboid shape in cross section.

Another further object of this invention is to provide a gasket retainer having a recessed pocket formed therein for reception of a gasket member as described above and with the bottom surface of the pocket being at an angle of substantially the same 10° amount as the parallel angle surfaces of the gasket member.

A still further additional object of this invention is to provide gasket sealing structure to effect a pressure differential sealing action wherein a gasket retainer having a circular trough therein supports a ring-like gasket member of trapezoid shape in cross section. The walls of the trough and the inner and outer edges of the gasket member are substantially parallel and perpendicular to the plane of the gasket retainer, and at least the outer sealing surface of the gasket member is at a predetermined angle to the surface it is to engage.

An additional further object of this invention is to provide a cartridge type oil filter element of the spin-on, throw away type having a cover closure plate provided with inlet and outlet fluid apertures centrally thereof, a gasket retainer member associated therewith and provided with similar inlet and outlet openings mating and matching with those in the cover plate, a gasket member retaining trough formed in the gasket retainer circumferentially around the inlet and outlet apertures and inwardly of the outer circumference of the gasket retainer, the gasket retainer trough being provided with a specially shaped in cross section, resilient, flexible gasket member. The gasket member having inner and outer sides substantially perpendicular to the cover plate while the inner and outer surfaces thereof form an angle of approximately 10° plus or minus 2° with the surface plane of the cover plate. The base of the trough in the gasket retainer also is provided with this same 10° plus or minus 2° angle with respect to the surface plane of the cover plate.

The invention disclosed herein involves the use of a parallel surface angled gasket member to obtain a differential pressure seal between an oil filter structure and an engine block sealing surface. The parallel surfaces are at an angle of approximately 10° plus or minus 2° and form the inner and outer surfaces of the gasket member. The sides of the gasket member, i.e. the inner and outer circumference thereof, are normally at an angle of 90° to the surface to be sealed. A gasket seal retaining member is provided with a complementary groove for reception of the gasket seal member therewithin. The retaining groove at the base thereof is made with an angle with respect to the plane of the sealing surface of approximately 10° plus or minus 2° to match that of the gasket member per se. The gasket retainer groove forms a support for the gasket member during the static sealing of the oil filter to the sealing surface of the engine block before oil pressure is applied to the filter.

During the static sealing operation, the highest point of the gasket corner makes contact with the sealing surface first. Then, as the gasket is comprssed by tightening up the oil filter, as is normally provided by a screw on stud as part of the engine block maturing with a correspondingly threaded aperture in the oil filter, the gasket tends to be deformed parallel to the sealing surface. This deformation of the gasket member results in a twisting motion which forces the diagonally opposite corner of the gasket to bear against the wall of the gasket retainer. Sufficient twist must be achieved in order to form a static seal between this sealing surface and the high edge of the gasket and the diagonally opposite corner of the high gasket as it is engaged with the groove wall in the retainer.

In operation as oil pressure is applied to the filter cartridge, the oil fluid passes between the inner wall groove of the retainer and the inner gasket wall from the side adjacent the high point of the gasket. This fluid moves to the bottom of the gasket pocket and commences to exert a force outwardly against the sealing surface. Simultaneously, the diagonally opposite corner of the gasket to the highest point is being compressed against the outer retainer wall effecting a greater and tighter seal thereat. This action continues to increase as the pressure of the fluid continues to increase. This highly desirable effect achieved by the differential pressure gasket member of this invention is only limited by the depth of the gasket retainer groove.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
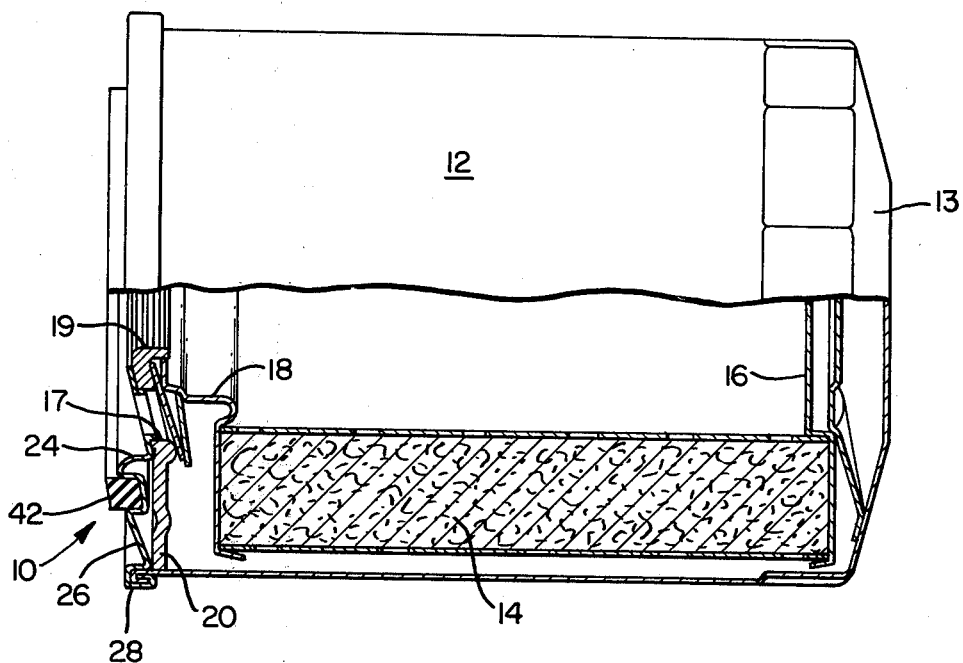
FIG. 1 is a side elevational view, partly in cross section, of a spin-on, throw away type oil filter cartridge incorporating the pressure differential gasket seal structure of this invention.

Referring to FIG. 1 of the drawings, reference numeral 10 indicates in general the subject invention as incorporated with an oil filter cartridge of the spin-on, throw away type. A housing or cartridge 12 is normally provided having internally thereof a filter element 14 which is suitably positioned between end retainer structures 16 and 18. The housing 12 normally is closed at end 13 and opened at the other end. A cover plate 20 normally closes the open end of the filter housing and is provided with a tapped central aperture 19 to permit screwing of the overall filter onto a threaded stud as normally associated with an engine block with which the filter is used. Oil flow holes 17 are also provided spaced circumferentially around the central aperture 19. A gasket retainer 22 is provided with a central aperture 21 which complements the tapped aperture 19 of the cover plate, and corresponding plurality of smaller fluid flow holes 23 are provided to complement the holes 17 of the cover plate. The gasket retainer 22 is provided with curved and sloping surface portions 24 and 26 forming trough 33, 35, 37 therebetween. The trough sides are provided by the portions 33 and 37 while the bottom or base of the trough is provided by the portion 35.

Figure 4:
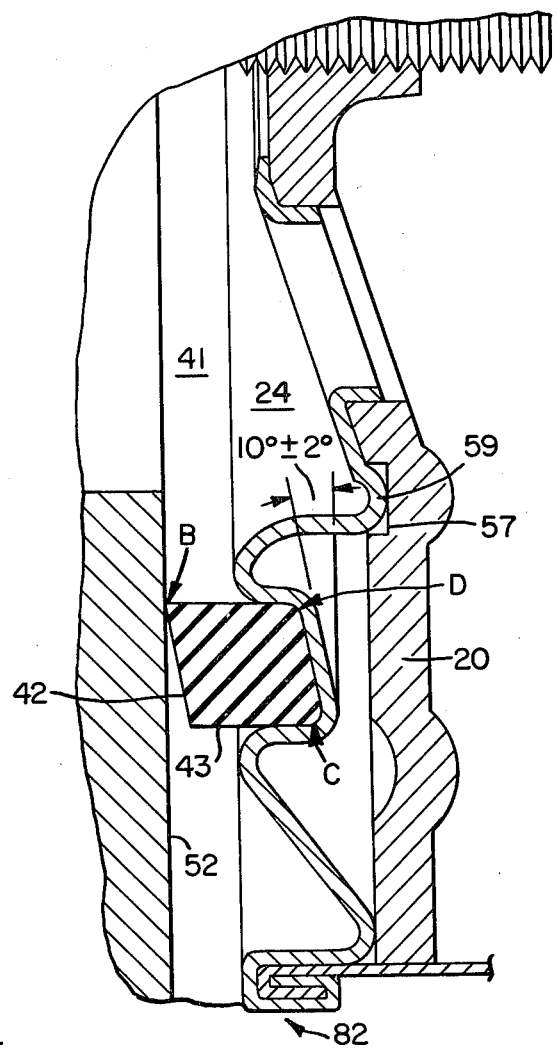
FIG. 4 is a view similar to FIG. 3 showing the gasket seal member just making contact with the sealing surface of an associated fluid flow member.

As best seen in FIG. 4, normally the base 35 of the trough is formed so that it is at an angle of approximately 10° plus or minus 2° with the plane of the supporting cover plate 20. The surface plane of cover plate 20 is perpendicular to the central axis of the filter cartridge. The outer circumferential edge of the gasket retainer is normally folded and interleaved with the open circumferential edge of the filter casing 12 during overall assembly of the structure. This folded over and interleaved joint indicated by 82 in FIG. 4, normally provides a fluid and pressure type connection. Groove 57 in cover plate 20 mates with rib 59 to align and center the gasket seal retainer.

Figure 2:
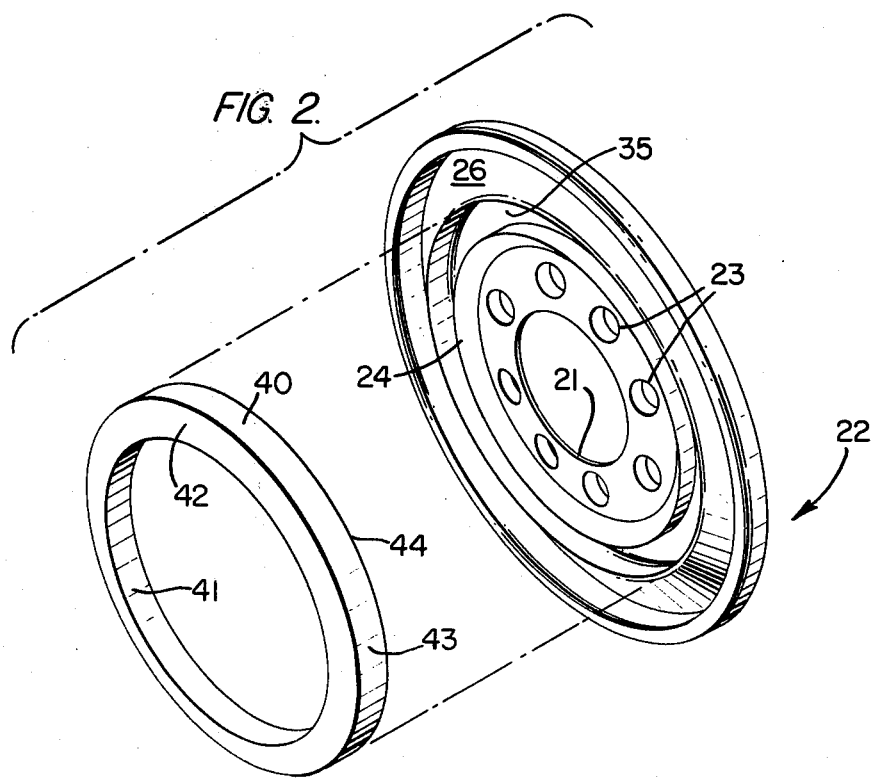
FIG. 2 is an exploded perspective view of the fluid seal gasket member and the gasket retainer member of this invention.
Figure 3:
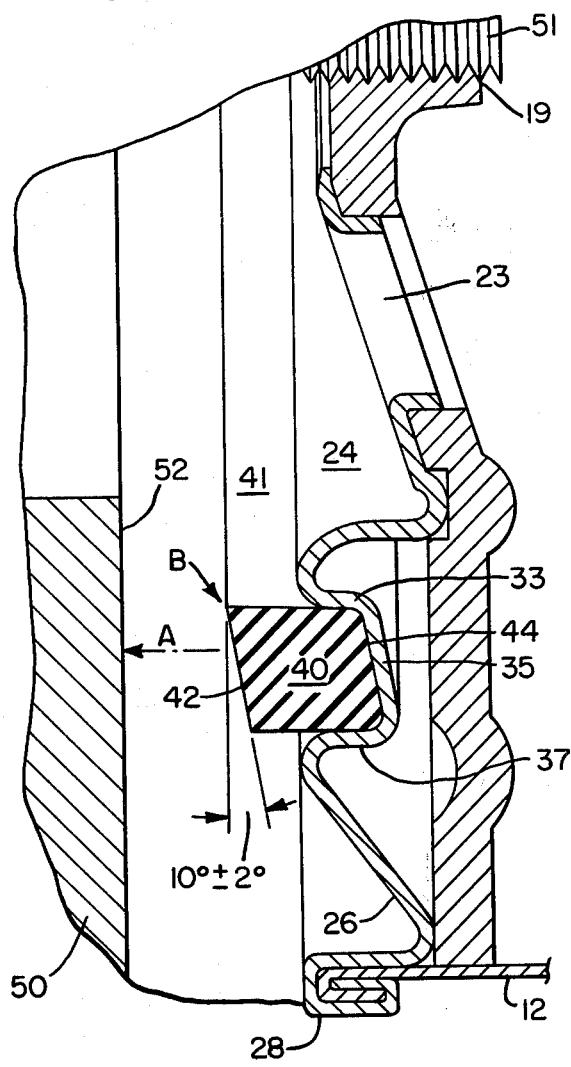
FIG. 3 is an enlarged fragmentary portion of the gasket seal member mounted in the gasket retainer as seen in cross section.

Now looking at FIG. 2, and the enlargement of FIG. 3, the gasket seal member 40 per se will be described. This gasket seal member is of generally ring-like configuration and has an inner side or edge 41, an external or outer edge 43, an outer sealing surface 42, and an inner sealing surface 44. The sides or edges 41 and 43 are parallel to each other and basically in alignment with the central axis of the filter cartridge, and thus normal or perpendicular to an engine block sealing surface 52. The seal outer engaging surface 42 as well as the inner surface 44 are likewise parallel to each other, but formed at an angle with the plane of cover plate 20 and the plane of sealing surface 52. This angle has been found to be preferably 10°, plus or minus 2°.

The gasket member 40 is made of rubber, or rubber like material, preferably of resilient yet oil and fluid resistance type material, which will deform under pressure, but offer sufficient firmness that a certain degree of basic pressure is required during initial installation to effect the desired results therefrom. As can best be seen in FIG. 3, in cross section the gasket sealing number 40 is in the shape of a rhomboid. That is, the inner and outer edges 41 and 43 are parallel while the front and rear surfaces 42 and 44 are likewise parallel to the each other, and the angles at the connecting corners of the adjacent edges and faces are respectively acute and obtuse.

Figure 5:
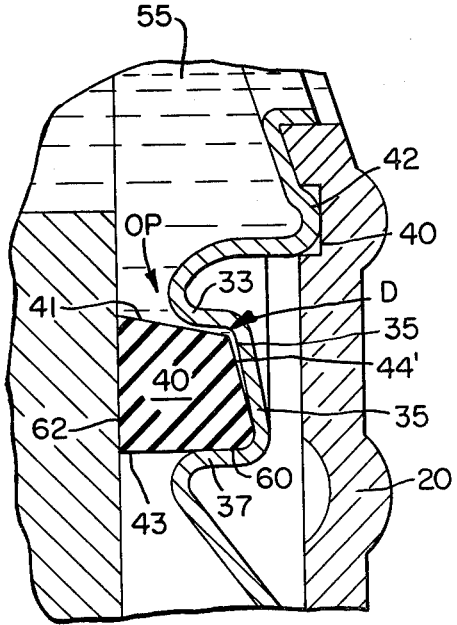
FIG. 5 is a view similar to FIGS. 3 and 4, but with the gasket seal member in full sealing engagement and with fluid pressure flow being provided therewith.

The installation and operation of the seal structure of this invention will now be described in detail with specific reference to FIGS. 3–5. FIG. 3 shows the filter cartridge as the central tapped aperture 19 of the cover plate 20 is initially screwed onto the threaded stud 51 of the engine block 50. These threads are generally 16 UNF type. As a cartridge is screwed onto the stud, the cartridge and gasket seal member 40 move axially of stud 51 in the direction A of FIG. 3. As the cartridge is further screwed onto the stud, the corner B, which is the high corner of the gasket seal member 40, comes into contact with the sealing surface 52 of the engine block. This corner B is the one provided by the acute angle between the inner edge 41 and the outer surface 42. Sufficient twist of the filter cartridge must be provided in order for a static seal to be properly formed between the sealing surfaces 42 and 52. With the normal 16 UNF threads, sufficient compression can be achieved by a 1/16th turn of the overally filter cartridge. Such static sealing is a result of the compression between corners B and C of the gasket seal member 40 (See FIG. 4). As the pressure is increased between these two corners by the further tightening of the filter cartridge, the gasket tends to deform with the outer surface 42 moving into sealing engagement over its entire face with the corresponding complementary surface 52 of the block. This pressure also results in a twisting motion which forces the diagonally opposite corner of the gasket member to bear against the wall of the gasket retainer groove formed at the junction of portions 35 and 37. This is at point C in FIG. 4. This normally will produce an area of reduced pressure at position D of FIG. 4. Thus, a good static seal between the filter pressure vessel and the mating sealing surface of the block is accomplished, and with the seal member 40 ready to function with pressure differential action.

Next, fluid pressure is applied to the system, as in the case of an engine, the engine being started and running, thus effecting an oil pressure build up in conventional manner. The oil pressure flow may be seen in FIG. 5, as indicated by reference 55, and in turn the fluid pressure thereof indicated by OP, against the static deformed portion of the gasket member 40 at the area D. That is, the inner edge 41 and the inside surface of trough portion 33, the gap at area D, and the space between the inside of trough base 35 and the deformed surface 44'. This pressure effects an increase of the seal 60 between the outside edge 43 and the inside of the portion 37 as well as between the outside sealing surface 42 and the sealing surface 52 as indicated by the reference numeral 62 in FIG. 5. As the oil pressure or other fluid pressure 55 increases, a corresponding increase of the sealing forces at points 60 and 62 will occur.

Thus, it can be readily seen how the pressure seal gasket structure of this invention will effectively form a good static seal upon initial association of the respective elements, and then will form an even better and more effective seal as fluid pressure increases in the system.

Figure 6:
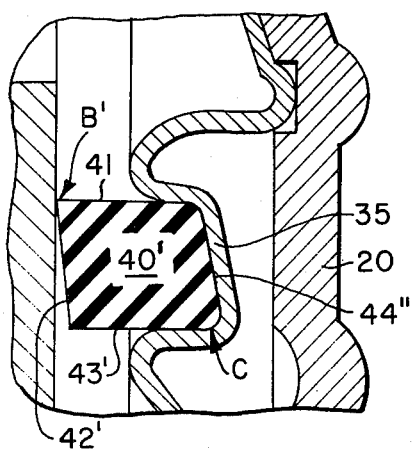

While this pressure differential seal structure has been specifically described in combination with an oil filter cartridge, it does have use in other and different combinations. The overall action and function of the gasket member 40 can be varied by changing the type of material of which it is made, and also by changing the depth of the trough as formed by portions 33, 35 and 37. For applications other than for use with oil filter cartridge of the throw away type, dimensions and shapes other than those described in detail herein are envisioned. The angle of the surface 42 is the most critical (must be less than 45°), and this invention envisions a modified cross section for the gasket member from the rhomboid one shown, to one such as a trapezoid or the like. That is, the inner and outer edges of the gasket member are parallel, and the outer sealing surface is at the desired predetermined angle with the inner sealing surface being at a modified angle therefrom or vice versa, as shown in FIG. 6. However, for the specific application with a filter cartridge, the materials, shapes, and angles as aforedescribed are extremely important for the proper functioning of this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A pressure differential sealing gasket for a fluid pressure structure comprising:
    a gasket retainer having a recessed groove portion for supporting a sealing gasket means;
    sealing gasket means of special configuration in cross section supported by said gasket retainer with at least the sealing surface being formed with a predetermined angle of more than 0° but less than 45° relative to the plane of said gasket retainer;
    and further means associated with the recessed groove portion so that said sealing gasket means will have an increase in sealing effect under an increase in pressure of fluid thereby.

2. The structure as set forth in claim 1, wherein said sealing gasket means of special configuration in cross section has the shape of a rhomboid forming a parallelogram with two pairs of parallel sides having two acute angles between adjacent sides and two obtuse angles between the remaining adjacent sides.

3. The structure as set forth in claim 1, wherein said sealing gasket means of special configuration in cross section has the shape of a trapezoid with one pair of parallel sides having two acute angles and two obtuse angles between adjacent sides.

4. The structure of claim 1 wherein said further means includes the bottom of said recessed groove being formed at an angle to the normal plane of the gasket retainer, said sealing gasket means being of rhomboid shape in cross section and supported within said recessed groove with the angled portion of said inner most angled surface of said rhomboid parallelogram complementing the angled bottom of the recessed groove in order to effect a static tensioning effect upon initial installation as well as a pressure differential effect when fluid pressure is applied against the inner edge of the gasket means.

5. A combination oil filter structure comprising:
    a cannister shell;
    a filter element contained therewithin;
    enclosure and support means for the cannister shell having fluid input and output apertures;
    a fluid sealing device;
    means for increasing the action of the fluid sealing device as fluid pressure associated therewith increases including;
    surface sealing means having a predetermined angle relative to the enclosure and support means of more than 0° but less than 45° and without projecting lips for substantially increasing the sealing action of the fluid sealing device as oil flow pressure increases.

6. The structure as set forth in claim 5, wherein the surface sealing means includes a gasket seal of trapezoid shape in cross section with the inner and outer edges of said gasket seal being generally perpendicular to a sealing surface with which it is normally associated, and the sealing surface engaging outer surface of said gasket seal being at said predetermined angle prior to contact with said sealing surface.

7. The structure as set forth in claim 6, together with a gasket retainer structure having a gasket seal supporting groove formed therein, with the bottom portion of said groove being formed at approximately the same angle as the predetermined angle of the said gasket outer sealing surface, and said gasket inner sealing surface also being at substantially the same predetermined angle as the outer sealing surface and the bottom portion of said groove.

8. The structure as set forth in claim 7, wherein said predetermined angle of the inner and outer sealing surfaces is approximately 10° in the initial preformed and undeformed shape of said gasket seal.

9. The structure as set forth in claim 8, wherein the gasket seal is made of firm yet resilient material and the initial sealing action is of the static type wherein the firm resilient gasket seal is partially deformed upon engagement with the associated sealing surface, and then upon an increase of fluid flow pressure thereadjacent a pressure differential sealing action will be effected.

10. The process of sealing pressure fluid connections including the steps of:
   forming a the sealing gasket member in a rhomboid shape;
   providing said preformed gasket seal member on a sealing end of a pressure vessel;
   attaching the sealing end of the pressure vessel to another structure sealing surface with an angled surface of the gasket member towards the structure sealing surface;
   applying static compression force to the rhomboid shaped sealing gasket to partially deform same into a static seal configuration, and
   thereafter applying fluid pressure adjacent thereto with the deformed shape of said gasket seal now being such as to further increase sealing action thereof as the pressure of the fluid is further increased to effect a dynamic sealing action of increased sealing force with an increase in fluid pressure.

11. The process of claim 10, wherein the preformed rhomboid shaped gasket seal member is normally formed with an angle of approximately 10° of the sealing surface thereof with respect to the structure sealing surface.

12. A liquid filter for removable attachment to a filter base having a flat filter sealing surface, a filter housing containing a filter element and having a cover means at one end thereof provided with liquid inlet and outlet ports, said cover means including an annular gasket receiving trough, said trough having sidewalls substantially perpendicular to said flat filter sealing surface, and a bottom wall formed at a predetermined angle of more than 0° and less than 45° relative to said cover means and said flat filter sealing surface as installed thereon, an annular elastically deformable gasket of rhomboid cross sectional configuration seated in said trough and adapted to be elastically compressed and deformed against said sealing surface by compressive force acting along the axis of the gasket when the filter is attached to said base, said rhomboid shaped gasket having inner and outer surfaces at approximately the same predetermined angle of more than 0° and less than 45° as the cover means trough.

13. A screw-on type oil filter adapted to be screwed onto an engine block comprising:
   a cylindrical casing open at one end;
   a cover plate closing said open end and provided with a central threaded opening for screwing onto a projecting stud of said enging block and a plurality of oil flow apertures around the central opening;
   a gasket retainer member associated with said cover plate and having matching oil flow apertures therein;
   said gasket retainer furthermore provided outwardly of the plurality of oil flow apertures with a circular and radially formed trough for holding a sealing gasket therein, the bottom of said trough being formed at a predetermined angle of more than 0° and less than 45° with respect to the plane of the gasket retainer; and
   a sealing gasket of pre-formed cross sectional configuration mounted within said trough, the inner and outer edges of said sealing gasket being approximately perpendicular to the plane of the gasket retainer member and at least one of the other two surfaces of the gasket seal being at a predetermined angle of more than 0° and less than 45° with respect to the plane of the gasket retainer.

14. The structure set forth in claim 13 wherein the said predetermined angle of the at least one of the other two surfaces is approximately 10° with respect to the plane of the gasket retainer.

15. The structure set forth in claim 13, wherein the predetermined angle of the bottom of the gasket retainer trough is approximately 10° with respect to the plane of the gasket retainer.

16. The structure set forth in claim 13, wherein the sealing gasket of pre-formed cross sectional configuration mounted within said trough is of rhomboid shape, the inner and outer edges of said rhomboid shaped sealing gasket being approximately perpendicular to the plane of the gasket retainer member and the other two parallel surfaces of the rhomboid shaped gasket seal being at the predetermined angle of more than 0° and less than 45° with respect to the plane of the gasket retainer.

17. The structure of claim 16, wherein the gasket seal is made of material having the characteristics of being firm yet resilient, compressable yet resistant thereto, and deformable under pressure to achieve a desired shape as determined by external contacting structure when associated therewith.

18. The structure set forth in claim 13, wherein the sealing gasket of pre-formed cross sectional configuration mounted within said trough is of trapezoid shape, the inner and outer edges of said trapezoid shaped sealing gasket being approximately perpendicular to the plane of the gasket retainer member and the outer one of the other two surfaces of the gasket seal being at a predetermined angle with respect to the plane of the gasket retainer.

19. The structure set forth in claim 18, wherein the said predetermined angle of the outer gasket seal surface is approximately 10° with respect to the plane of the gasket retainer.

20. The structure set forth in claim 19, wherein the sealing gasket is formed of material which is flexible, resilient yet firm, petroleum product resistant and inherently has a compression resistant characteristic.

* * * * *

UNITED STATES PATENT AND TRADEMARK OFFICE
CERTIFICATE OF CORRECTION

PATENT NO. : 4,168,237
DATED : September 18, 1979
INVENTOR(S) : CHARLES G. PICKETT ET AL.

It is certified that error appears in the above-identified patent and that said Letters Patent are hereby corrected as shown below:

Col. 3, line 10, "comprssed" should be --compressed--;

Col. 5, line 10, "overally" should be --overall--;

Col. 6, line 50, "cannister" should be --canister--;

Col. 6, line 52, "cannister" should be --canister--;

Col. 7, line 28, delete "the";

Col. 8, line 8, "enging" should be --engine--.

Signed and Sealed this

First Day of April 1980

[SEAL]

Attest:

SIDNEY A. DIAMOND

Attesting Officer

Commissioner of Patents and Trademarks